United States Patent
Carr et al.

(10) Patent No.: US 10,572,527 B1
(45) Date of Patent: *Feb. 25, 2020

(54) ENHANCEMENT OF SEARCH RESULTS

(71) Applicant: RINA SYSTEMS, LLC., Cincinnati, OH (US)

(72) Inventors: Terence M Carr, Ft. Wright, KY (US); Leo Zamansky, Mason, OH (US)

(73) Assignee: RINA SYSTEMS, LLC., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/428,220

(22) Filed: May 31, 2019

Related U.S. Application Data

(63) Continuation of application No. 16/216,975, filed on Dec. 11, 2018, now Pat. No. 10,353,940.

(51) Int. Cl.
| | | |
|---|---|---|
| *G06F 17/30* | (2006.01) | |
| *G06F 16/35* | (2019.01) | |
| *G06F 16/332* | (2019.01) | |
| *G06K 9/62* | (2006.01) | |
| *G06F 16/338* | (2019.01) | |

(52) U.S. Cl.
CPC ............ *G06F 16/35* (2019.01); *G06F 16/338* (2019.01); *G06F 16/3326* (2019.01); *G06K 9/6257* (2013.01)

(58) Field of Classification Search
None
See application file for complete search history.

(56) References Cited

U.S. PATENT DOCUMENTS

| | | | |
|---|---|---|---|
| 7,272,558 B1* | 9/2007 | Soucy | G10L 15/063 704/235 |
| 2010/0057719 A1* | 3/2010 | Kulkarni | G06F 16/951 707/E17.108 |
| 2012/0259801 A1* | 10/2012 | Ji | G06N 20/00 706/12 |
| 2013/0191310 A1* | 7/2013 | Awadallah | G06F 16/33 706/12 |
| 2014/0372349 A1* | 12/2014 | Driscoll | G06N 5/04 706/12 |
| 2015/0019463 A1* | 1/2015 | Simard | G06F 17/2785 706/12 |
| 2015/0195145 A1* | 7/2015 | Di Pietro | H04L 43/0876 706/12 |
| 2019/0066290 A1* | 2/2019 | Shaubi | G06T 7/0004 |

(Continued)

*Primary Examiner* — Hung D Le
(74) *Attorney, Agent, or Firm* — Ronald L. Rohde

(57) ABSTRACT

Systems and methods for improving search results from proprietary search engine technologies and proprietary machine classifiers, without ingesting, copying, or storing, the data to be searched, are described herein. A user sends a query to a proprietary search engines and gets a result document set back. The user may apply a user model for classifying a result document set to generate a result document for review of a user. The reviewed document may be added to a user training corpus, which is then used to retrain the user model. The retrained user model may be applied by the user to generate the next result document for user review and so on until the user model converges to generate relevant documents reliably. Once the user model converges, the user may apply the now reliable user model to generate multiple relevant documents for the user.

23 Claims, 6 Drawing Sheets

(56) References Cited

U.S. PATENT DOCUMENTS

2019/0139434 A1\* 5/2019 DeLuca ............... G09B 7/04
2019/0147099 A1\* 5/2019 Ginsberg ............ G10L 15/183
                                                        704/231

\* cited by examiner

ENHANCEMENT OF SEARCH RESULTS

CROSS-REFERENCE TO RELATED APPLICATIONS

The present application claims priority and benefit of U.S. patent application Ser. No. 16/216,975, filed on Dec. 11, 2018 and titled "ENHANCEMENT OF SEARCH RESULTS," which is incorporated by reference herein in its entirety.

FIELD OF THE PRESENT TECHNOLOGY

The present disclosure relates to systems and methods of improving proprietary machine search technology. More particularly the present disclosure relates to technology for improving results obtained from proprietary document collections, proprietary machine search technology including proprietary machine search engine technologies, and proprietary machine classification technologies, particularly document collections and search technologies that are on a server, in a network, within a cloud, or at a remote website.

SUMMARY

Enterprise search engines and classifiers may receive a query from outside the enterprise for searching proprietary data using a process that is within the enterprise. The enterprise may process the query inside the enterprise and then return a set of result documents back outside the enterprise. However, proprietary data and details of components and structures of the search engine that are used inside the enterprise to generate the result document set may be proprietary to the enterprise and, thus, not visible outside the enterprise even if the result document set is available outside.

One problem that has been determined in the course of developing the claimed technology is that copying and storing data from the enterprise document universe outside the enterprise can be difficult. This is because the enterprise document universe may include many gigabytes, terabytes, petabytes, or more of data. There are problems related to bandwidth and time for transferring and/or processing such large amounts of data out of the enterprise, as well as problems related to large amounts of storage for the data. In addition to these problems, the enterprise may be reluctant to expose its data because the data is proprietary or trade secret. Further, the enterprises might not even be in possession of all the data it searches, and may elect not to divulge all the data sources it accesses during a search.

Another problem that has been determined in the course of developing the claimed technology is that protecting proprietary technology and document universes may pose a barrier to collaboration with an outside third party on data sharing and/or evaluation. Collaboration may be precluded by a reluctance of the enterprise to grant access to its proprietary information in one or more components of the proprietary search engine, machine classifier model, training corpus, or document universe. Collaboration may also be precluded because the enterprise uses off-the-shelf or custom technology that has been licensed from a vendor and the technology is rendered unavailable under the terms of the license.

Another perhaps more serious problem is that if the result documents are ranked, the ranking of result documents are often performed according to business models internal to the enterprise, rather than according to the benefit of the outside user. As a result the enterprise rankings may not be useful to the user who submitted the query. Moreover, unrelated documents may be inserted into the result documents without regard to relevance or ranking, such as advertising or push notifications, because the enterprise is paid to include them. Such documents may also be ranked highly in the interest of payment received for the ranking. For example, the ranking may be based on a date associated with the document, a serial number for the document, a size of the document, a number of words, a number of pages, and/or the like.

Yet another problem is that any one of many different types of search engines, classifiers or models, and training systems could be what are used inside the enterprise. Moreover the quality of training sets may vary substantially. These differences may produce widely varying result document sets. Yet another problem is that a user outside the enterprise may wish to keep interests of the user confidential and prevent the enterprise from inferring the user's interests from details of a classifier model, training documents, or document review data.

These problems may be addressed by analyzing a result document set outside the enterprise, without ingesting, copying, or storing the data from the enterprise document universe. The analysis may apply a user model to classify some or all of the result document set and select a document in the result document set for review by the user. A user training corpus is revised by adding the reviewed document to the user training corpus. The revised user training corpus is then used to retrain the user model. The retrained user model may be used to generate the next result document for user review and so on until the user model quickly converges to generate relevant documents reliably. Once the user model converges, the now reliable user model may be used to select multiple relevant documents for the user from the result document set. This solution is agnostic with respect to the contents of the document universe, and the type of classifier or search engine that is used inside the enterprise to return result document sets to the user outside the enterprise.

In another embodiment, a group of one or more result documents are received from the search engine. A user model is used to analyze and rank the group result document(s). The best document in the group is either presented to the user or not presented to the user, e.g., based on a threshold. If the best document is presented to the user for review, then the user training corpus is revised by addition of the reviewed document to the user training corpus, and the revised user training corpus is used to retrain the user model. Remaining documents in the group may be analyzed and ranked by the retrained user model. Each time the remaining result document(s) are analyzed and ranked by the user mode, the best document is either presented or not presented to the user based on the analyses.

If the best document is not presented to the user, or if no more result documents remain in the group, then a next group of one or more result documents may be received from the search engine. The next group may be similarly analyzed. The result documents in the group that are not presented to the user are not added to the training corpus.

With each reviewed document, the user model rapidly converges to classify documents more and more reliably. As the user model converges, the user may elect at any point to end or exit the analysis, e.g., to apply the user model to a larger group of result documents, or a group of result documents based on another query. The user model may be saved for application to documents generated by another query.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
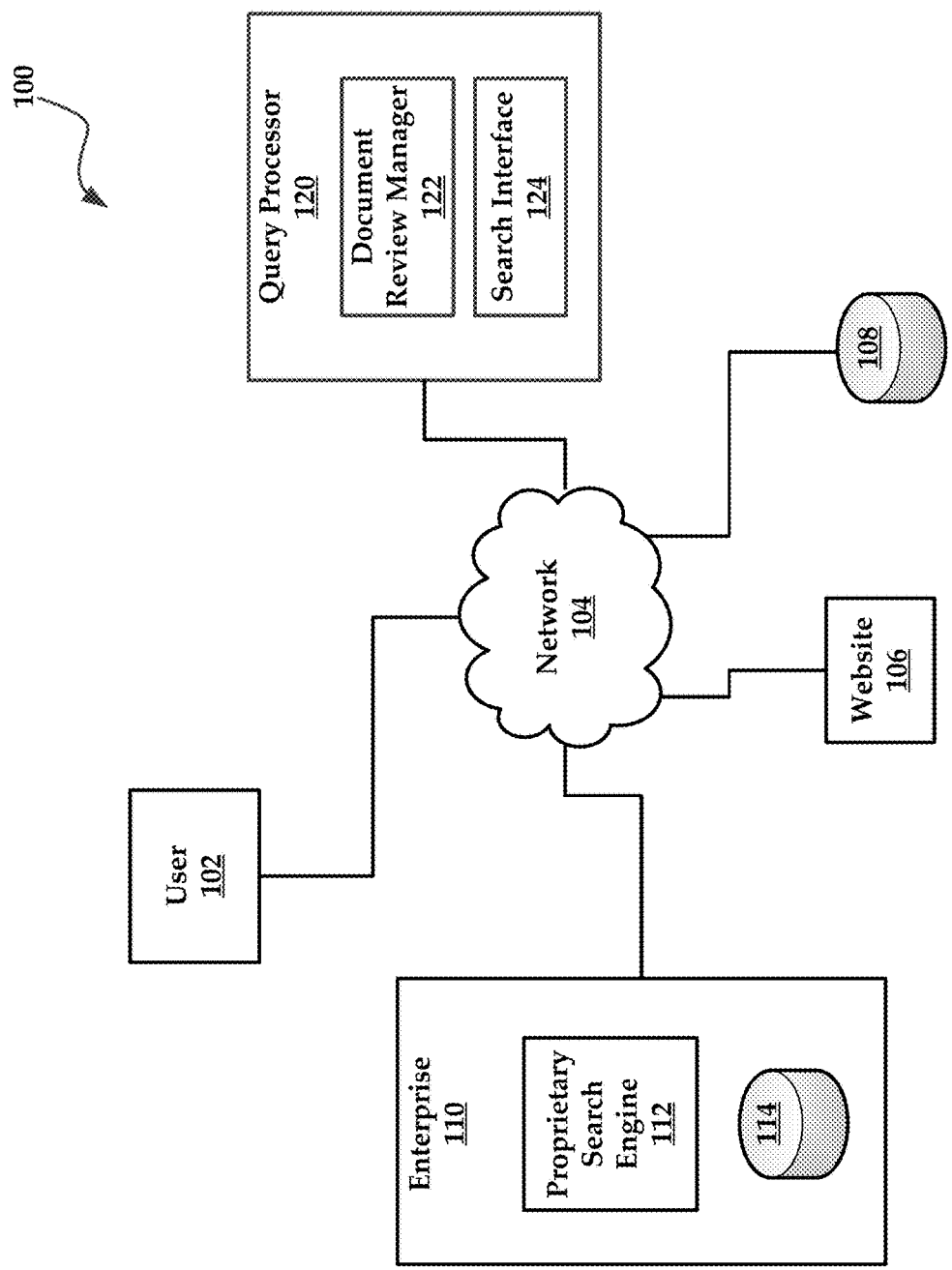
FIG. 1 illustrates an environment in which a query processor may improve technology of an enterprise, in accordance with aspects of the technology.

Embodiments of the present disclosure are directed to machine technology for significantly improving proprietary search engine technologies and/or machine classifier technologies and results received from these technologies. Machine classification (or simply classification) is technology for applying a model or classifier to a document to generate a score that indicates how likely the document is to be relevant to a tag or category associated with the model. The model may be trained using a training set and machine training technology. A document may be classified as being relevant if a score for a category exceeds a threshold for the category. Classification models can be applied to a set of documents to determine one or more scores indicating how likely it is that the document is relevant the category (e.g., medical device test reports, FDA applications, device engineering and prototyping, device marketing, financial documents, etc.).

A search engine is a machine technology that may use one or more keywords to identify relevant documents. Two or more of keywords arranged as a Boolean expression may be used to refine the search. In some embodiments, a search engine may be thought of as a particular instance of machine classification system.

A document review is performed by a user. A document review differs from a classification or search in that a human performs the review and the document review typically generates either 1 (the document is relevant to the user) or 0 (the document is not relevant to the user). Classification technology may generate a score between 0.0-1.0 (or a percentage between 0-100%) indicating a likelihood that the document is in the category or relevance of the document to the category. The terms "classifier" and "model" may be used interchangeably in the present application An enterprise may consider one or more components of the structure and/or contents of their search engine or classifier technology (including their models and training data), and/or portions of their document universe to be closely guarded proprietary information such as trade secrets or other types of information of great value. The enterprise may therefore zealously guard their technology, including the proprietary information of these components. In some instances collaboration with an outside third party for the purpose of developing and/or improving the results of a proprietary search engine or classifier may be of advantage to the enterprise and/or third party. Such collaboration may involve access to one or more of these proprietary components of the enterprise technology by the third party.

In the course of developing the claimed technology, the inventors have recognized problems an outside the third party may encounter in improving the results of the proprietary search engine or classifier technology. This may be merely due to convenience and/or logistics encountered when two different organizations attempt to work together. This may also be the case when the structure and/or contents of a search engine, model or classifier, training data, and/or portions of the document universe are considered to be proprietary technology by the enterprise and consequently not made available for analysis or modification. Collaboration with the outside third party on data evaluation may be precluded by a reluctance to grant access to proprietary information in one or more components of the proprietary search engine, model, training data, and/or portions of the document universe belonging to the enterprise. Thus, improving the results of the search by technology belonging to the enterprise may be rendered difficult or impossible for the third party, even when desired by the enterprise and/or third party.

A typical document collection or universe may include 100,000 to 100,000,000 documents or more. In response to a query submitted by an outside third party user to an enterprise, the enterprise may perform an initial search using proprietary technology, including a proprietary search engine or a previously trained proprietary machine classifier to search the document universe, portions of which may also be proprietary. The search may return many documents for the user from the document universe.

Sometimes the number of result documents returned as a result of a query is more than the user can handle. This may be true when the query is processed using closely guarded proprietary technology applied to proprietary databases or document universes belonging to an enterprise such as the USPTO. For example, 10,000 result documents may be returned in response to a query. However a typical human user may be able to review only about 45 documents in the set of result documents per hour to determine which of the result documents are relevant. Unfortunately, at that rate it could take the user a couple hundred hours to review all the result documents to find all the relevant documents. More generally, major search engines in the US and other countries generally return millions or tens of millions of result documents in response to a search query. It would be virtually impossible for a human reviewer to effectively search the results within one lifetime.

The result documents may be ranked for the user based on scores calculated by the proprietary search engine or classifier technology. However, information from the user's query is generally not used for training the proprietary model, and the enterprise may have no additional information about the user. In such case, the ranking based on the proprietary search engine or classifier cannot be based on any information about the user or what the user wants, other than information in the query. The ranking is not likely to be relevant to the user. Even if the query is used for calculating a ranking, the query is typically a keyword or two or more of keywords arranged as a Boolean expression, which is a very small amount of information compared to a proprietary training set for a proprietary model. Even when the enterprise does have information gathered about the user (often surreptitiously as in the case of major commercial search engine enterprises in this and other countries), the enterprise may rank the results of the query without any regard to the user's benefit. Rather, a major commercial search engine enterprise is much more likely to rank search results for its own benefit based on its own business model, which is very often to the detriment of the user. In various other embodiments, the ranking is based on a date associated with the document, a serial number for the document, a size of the document, a number of words, a number of pages, and/or the like. Such rankings may not be of interest to the user.

In general, embodiments of the present disclosure are directed to significantly improving the processing of a query using proprietary search engine technologies or machine classifier technologies, but without ingesting, copying, or storing the data from the enterprise document universe. This may be accomplished, for example, by significantly reducing the number of results returned by eliminating results that are not relevant to the user.

For example, a proprietary search engine or classifier may be applied to the documents in a 1,000,000 document universe, and generate a set of resulting documents. Typically the set of resulting documents are ranked by the proprietary search engine or classifier. One or more initial document may be presented to the user from the resulting documents, and may be based on the ranking. The user may review the initial document(s). A user machine learning system may use the reviewed initial document(s) along with feedback from the user review of the initial document(s) as a user training set to build a user machine classification model.

Then the user machine classification model may be applied to the next resulting document to determine whether or not to present the document to the user for review. If the user machine classification model determines that the document should be present to the user, the user may review the next document. If not, review of the document is rejected and the user machine classification model may be applied to the next document from the resulting document set. Multiple documents in a row may be rejected before a document is identified as being appropriate for review by the user. The machine classification model may be used as a filter to reject documents that are a waste of time for the user. Similarly multiple documents in a row may be found appropriate for presenting to the user by the machine classification model.

Upon identifying a document for presentation to the user, the user may review the document. Then the document may be added to the user training set along with the user review (relevant/not relevant). The user machine classification model may be trained or retrained using the user training set (including the added document). Then the retrained model may be applied to the next document to determine whether or not the document should be presented to the user for review. This process of analyzing one document at a time for review (and if reviewed, training set update, and model retraining) may be repeated. With each document that is analyzed as being appropriate for review, more and more reviewed documents and reviews of the documents are added to the training set.

As more and more reviewed documents and reviews are added to the user training set, the user model becomes better trained or more personalized to the user. As the user model becomes more personalized, the user model selects documents from the set of resulting documents that are highly relevant to the user. It is noteworthy that documents selected by the user model may not be relevant to another user even if both users used the same query. That is, a user model trained for the one user may be a completely different from a model that is specific to the another user, even if the initial search is executed using the same or substantially same query.

It is also noteworthy that the proprietary search engine, proprietary model, and proprietary training set, can be entirely independent of the user training set and user model. This is because the proprietary training set and proprietary model can be built entirely without reference to, or knowledge of the user. Likewise, the user training set and user model can be generated without any knowledge of how the search engine functions and without any knowledge of how the proprietary training set and proprietary model are built. More generally, the user classifier or model is agnostic with respect to the nature of the proprietary search engine or classifier.

Problems addressed by this technology include an understanding that two users who initiate the same or similar initial query using, proprietary training set and proprietary model to classify a proprietary document universe may be looking for different types of documents among the documents in the set of result documents. That is, a search is generally personal to each user even when they are both using the same or similar keywords to search the same document universe. Only a few of the documents in the set of result documents might be relevant to either user. And even fewer of the documents might be relevant to both users. It is also noteworthy that each user may be considered to be an accurate, highly skilled, and reliable reviewer for the documents that are personally relevant to them. However, no matter how skilled, accurate, and reliable a user might be, checking all the result documents in the set of result documents may not be practicable for either user when the set is large, e.g., on the order of 1,000-10,000 documents or more.

In the course of developing the claimed technology, it has been experimentally verified that a user model can converge to consistently relevant documents after only a relatively few documents have been reviewed by the user. For a well constructed query, the user model has been observed to converge after about 50 documents have been reviewed by the user. More generally, the user model has been observed to converge after less than about 0.1%-0.5% of the set of result documents have been reviewed by the user. Thus, the claimed technology has been demonstrated experimentally to be very fast and very efficient when used for training a user classification model that is specific to a user.

A document may be a file that is provided in textual format, graphics format, and mixed text and graphics. In various embodiments, the format of the document is email, Word, PDF, jpeg, mpeg, web site, webpage, and/or the like. Types of document content includes text, images, graphs, drawings, videos, audio, animation, media, web pages, links to web sites, web pages, web objects, and/or the like. Typically it is text that is analyzed using classification models based on text information. However, any of these other types of content may be relevant to a user. Models may be trained using any combination these various types of elements. For example, face recognition may be used to classify images reviewed by the user to train a user classification model to find a particular person for the user in the set of result documents. Similarly, audio or video files may be used.

In another example, the document presented to the user for review is a link to a web site. At a first level, the web site may describe a product of interest to the user (e.g., matching a keyword in the query) and include links to 3 different manufacturer web pages for a product. At a second level, each manufacture web page may describe one or more models of the product and provide links to web pages that describe details about each model. And each model web page may provide links to customer reviews for the model. While the user is reviewing the web site, the various pages linked to from the web site may be analyzed in the background. The analysis may be carried to a depth of three levels (for example) to identify web pages that are appropriate for presenting to the user for review. While three levels of review are described in this example, more or fewer levels of review are contemplated.

FIG. 1 illustrates an environment 100 in which a query processor 120 may improve technology of an enterprise 110, in accordance with aspects of the technology. Structural and hardware components of the system 100 include a user 102, the query processor 120, the enterprise 110 and a network 104. The query processor 120 of FIG. 1 includes a user document review manager 122 and search interface 124. The enterprise 110 of FIG. 1 includes a proprietary search engine 112 and a proprietary document repository 114. The user 102, the query processor 120, and the enterprise 110 may be communicatively coupled via the network 104, which may comprise any of a local area network ("LAN"), a wide area network ("WAN"), or any other private or public network, such as the Internet. The network 104 may also comprise a telecommunications network. In some embodiments the query processor 120 and/or enterprise 110 is a server or a component of a server. In various embodiments, the user 102 may communicate with the query processor 120 and/or via the network 104 using a personal computer (PC), a tablet PC, a set-top box (STB), a personal digital assistant (PDA), a cellular telephone, and/or the like.

Figure 3:
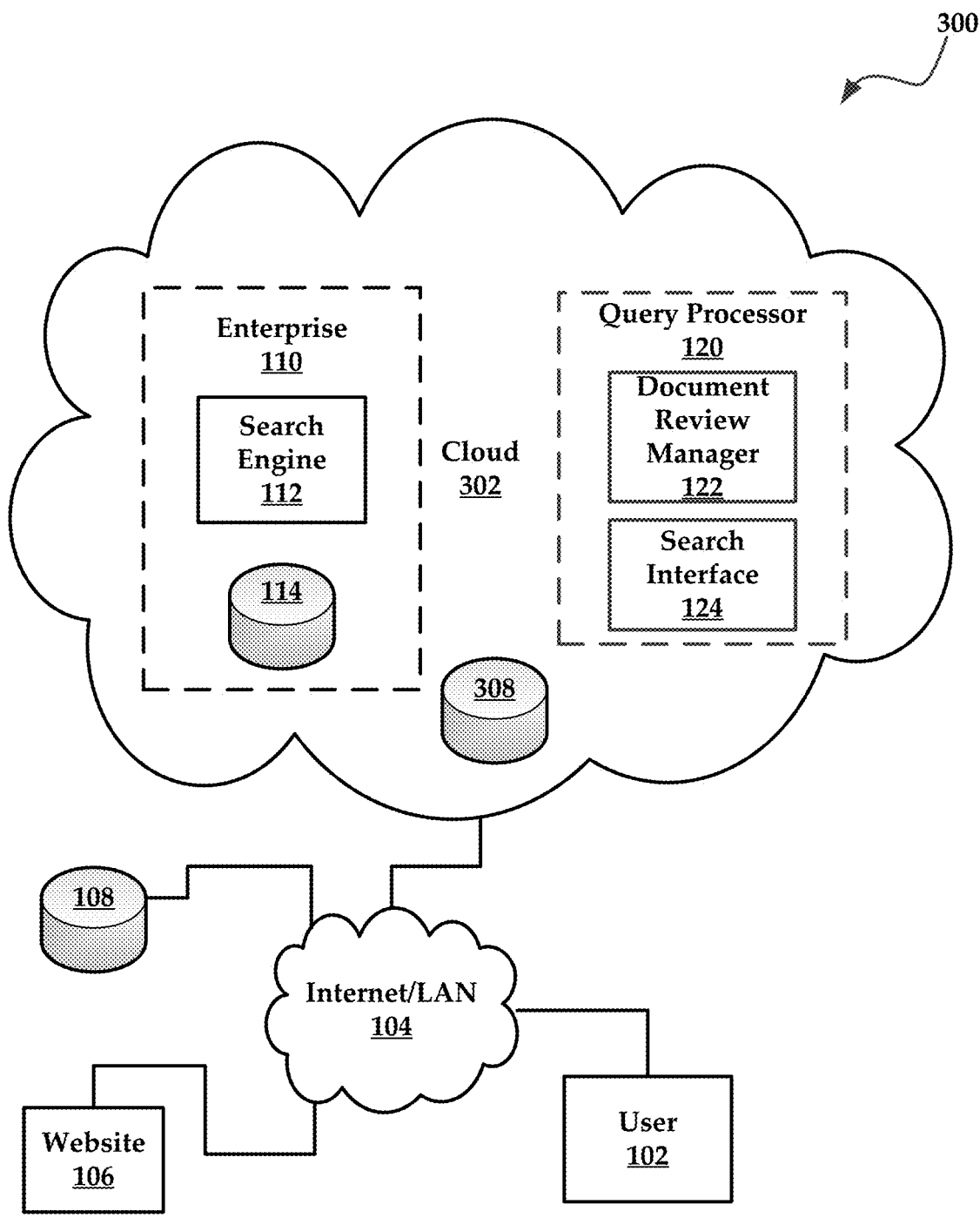
FIG. 3 illustrates an alternative environment where a query processor may improve enterprise technology, in accordance with aspects of the technology.

The document universe includes various combinations of the document repository 114, one or more website 106, one or more external databases 108, and one or more cloud databases 308 (illustrated in FIG. 3). In various embodiments, the network 104 includes local network, a wide area network, the Internet, and/or the like.

The search interface 124 of the query processor 120 is configured to receive a query from the user 102. An example of the query is a keyword or two or more of keywords arranged as a Boolean expression. The search interface 124 may submit the query to the enterprise 110. The proprietary search engine 112 at the enterprise 110 may perform a search of the documents in the document universe and return a set of documents to the query processor 120, without ingesting, copying, or storing the enterprise document universe. The set of result documents may be received by the search interface 124 and provided to the document review manager 122. In some embodiments, the result documents are ranked. In some embodiments, the user 102 is may be directly in communication with the query processor 120 or may be a component of the query processor 120. For simplicity only one user 102 is illustrated in FIG. 1 (and FIG. 4). However, more than one user 102 may be in communication with the query processor 120 directly or via the network 104. While the enterprise 110 and query processor are illustrated in FIG. 1 as being separate entities, in some embodiments, the enterprise 110 and query processor are the same entity.

While only one enterprise 110 is illustrated in FIG. 1, multiple enterprises 110, each having its own proprietary search engine 112 and/or proprietary database 114 may be available to be searched in parallel or serially. A query may be submitted to each of the plurality of enterprises 110 by the search interface 124. Result documents may be received by the query processor 124 from the plurality of enterprises 110 for processing using the document review manager 122 as described elsewhere herein.

Figure 2:
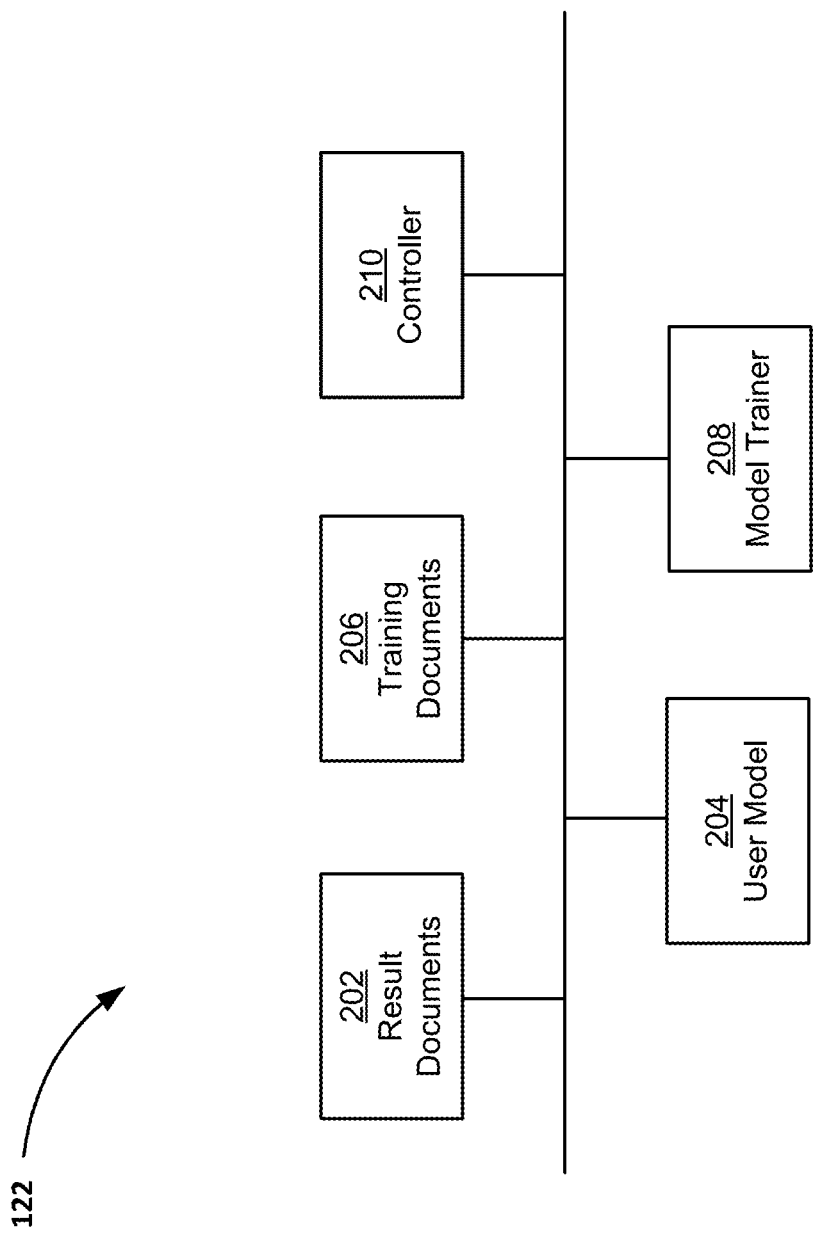
FIG. 2 is a block diagram illustrating details of the user document review manager.

FIG. 2 is a block diagram illustrating details of the user document review manager 122. The user document review manager 122 includes an optional result documents buffer 202, a user classification model 204, user training document buffer 206, a model trainer 208, and a controller 210. The controller may receive one or more result documents from the search interface 124 and, optionally, place the received document(s) in the result documents buffer 202.

The controller 210 may use the user classification model 204 for selecting a document from the set of result documents in the result documents buffer 202. In some embodiments, the controller uses the user classification model 204 to analyze one document at a time to determine if the document is appropriate for user review. Alternatively, the controller may use the user classification model 204 to analyze a plurality of result documents and rank the analyzed documents for presentation to the user for review.

The controller 210 may provide the selected document to the user 102, optionally via the search interface 124. The user 102 may indicate to the query processor 120 that the selected document is relevant or not relevant, optionally via the search interface 124.

The controller 210 may add the reviewed document into the user training document buffer 206. In various embodiments, the controller 210 places only relevant documents, only non-relevant documents, or any reviewed document, in the user training buffer 206. The controller 210 may also place the user's review of the document in the training document buffer 206. The model trainer 208 may retrain the user model 204 using the user training documents in the user training documents buffer 206. In various embodiments retraining of the user model 204 is performed after each document is reviewed, after a predetermined number of reviews, after predetermined number of reviewed documents are relevant, or when a predetermined percentage of reviewed documents are relevant.

The controller 210 may apply the user classification model 204 classify the result documents 202 for selecting a next document from the set of result documents in the result documents 202. Alternatively, the controller 210 may apply the user classification model 204 to one document at a time to determine for each document whether or not to present the document to the user for review. This process may be repeated for a predetermined number of documents selected from the set of result documents, and then halted. In various embodiments, this process is halted after a number of relevant documents identified by the user 102 exceeds a threshold, a percentage of relevant documents is identified by the user 102 exceeds a threshold, or upon an indication by the user 102, optionally via the search interface 124. Upon halting the repetitions, the controller 210 may use the user classification model 204 for classifying a batch of the remaining documents in the result documents buffer 202. The classified documents may be accessed by the user 102, optionally via the search interface 124.

In some embodiments, the documents in the result documents 202 are ranked and first document selected from the set of result documents is a highest ranked document. Alternatively, the first document selected result documents 202 document is selected at random. In some embodiments, the first selected document is used as a single document training corpus for training the user model 204. Alternatively, a predetermined number of documents from the result documents 202 are reviewed and placed in the training documents buffer 206 before first training the user model 204.

In some embodiments, the user classification model 204 ranks documents from the result documents buffer 202. For example, the user classification model 204 may calculate a score for some or all of the documents in the result documents buffer 202. These documents may be sorted according to their scores. The controller 210 may then select one or more documents from among the highest rank documents to provide to the user 102 for review.

The terms "training models" and "building model'" may be used interchangeably throughout this disclosure. Similarly, the terms "model trainer" and "model builder" may be used interchangeably throughout this disclosure. Similarly, the terms "model" and "classifier" may be used interchangeably throughout this disclosure. Examples of user classification model 204 used in machine classification of result documents 202 include user classification model 204 built by model trainers 208 using various techniques including Naive Bayes, Logistic Regression, Decision or classification Trees, Nearest Neighbors, Ensembles (Random Forests, Gradient Boosting), Neural Networks, Support Vector Machines (SVM), discriminate analysis, and/or the like.

A model trainer 208 may analyze errors between data (e.g., document reviews by the user 102) and expected values predicted by the user classification model 204 and revise the user model 204 to minimize the errors, using techniques understood by a person having ordinary skill in the arts with the present disclosure before them for various classifiers using various techniques including Naive Bayes, Logistic Regression, Decision or classification Trees, Nearest Neighbors, Ensembles (Random Forests, Gradient Boosting), Neural Networks, Support Vector Machines (SVM), discriminate analysis, and/or the like.

In some embodiments, after training and retraining the user model 204 on a number of reviewed documents drawn from the result set 202, the user model 204 is stored for use on another set of result documents received from the enterprise 110, or another enterprise. Multiple user models 204 may be stored for multiple categories using one or more set of result documents. The multiple user models 204 may be generated at different times or concurrently. For example, while only one user model 204 is described as being trained by document reviews from only one user 102, one or more users 102 may review a document and determine that the document is relevant and/or non-relevant to multiple categories. Thus, multiple user models 204 may be trained concurrently.

FIG. 3 illustrates an alternative environment 300 where a query processor may improve enterprise technology, in accordance with aspects of the technology. FIG. 3 differs from FIG. 1 in that the enterprise 110 and the query processor 120 are implemented within a cloud-based computing environment 302 and the cloud 302 includes one or more optional cloud databases 308. In general, a cloud-based computing environment 302 is a resource that typically combines the computational power of a large model of processors and/or that combines the storage capacity of a large model of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud 302 may be formed, for example, by a network of servers, with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user. FIG. 2 also differs from FIG. 3 in that communication between the query processor 120 and the enterprise 110 (and the optional cloud databases 308) may be provided within the cloud by cloud processors for the cloud and/or the network servers of the cloud in FIG. 3.

Figure 4:
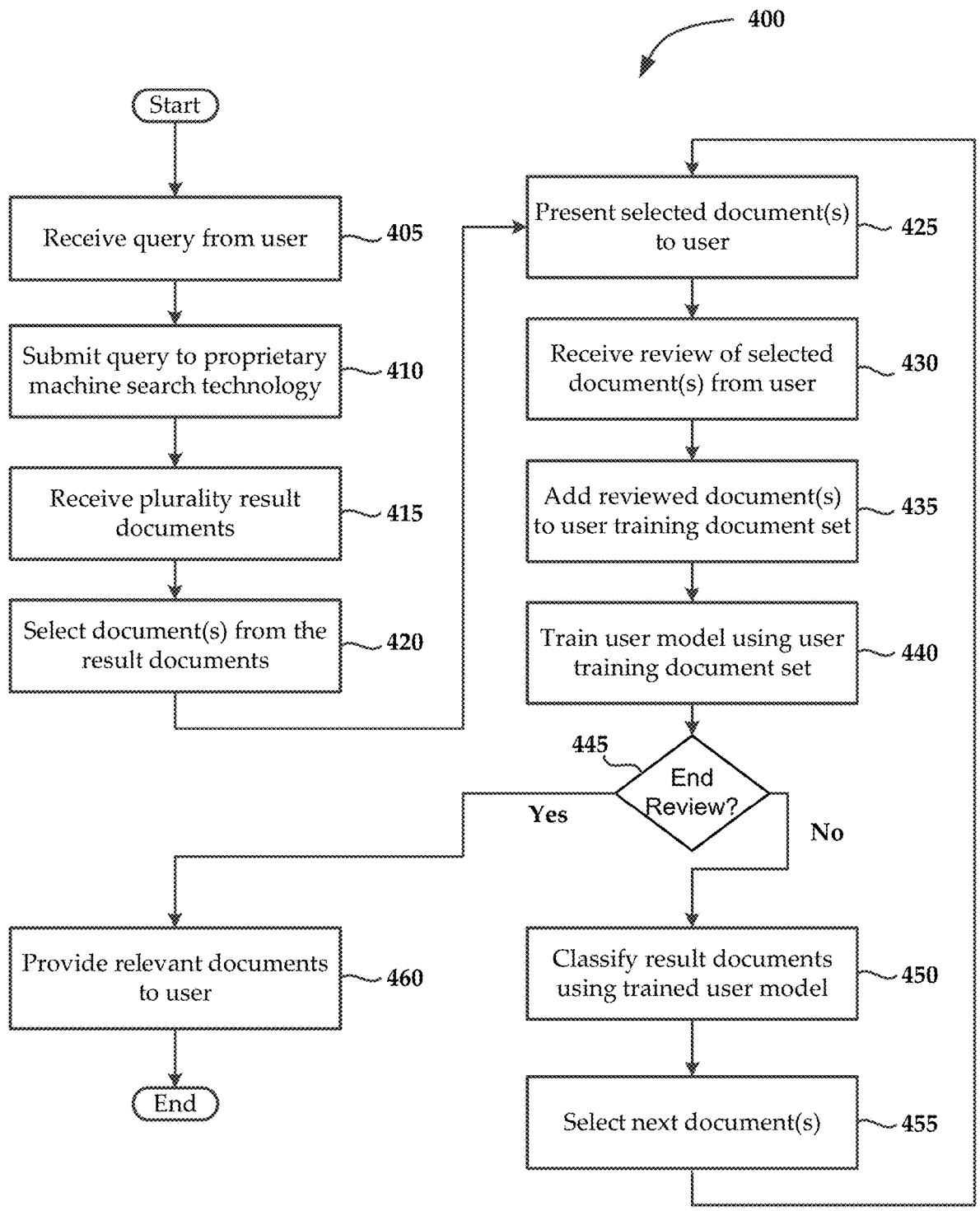
FIG. 4 is a flow diagram of an exemplary method for improving proprietary machine search technology.

FIG. 4 is a flow diagram of an example method 400 for improving proprietary machine search technology. At step 405 a query is received from a user (e.g., user 102). The query may be received at a query processor 120 directly from the user 102 or via a network 104.

At step 410, the query is submitted to proprietary machine search technology. For example, the query may be submitted to the enterprise 110, for processing by the proprietary search engine 112. The proprietary search engine 112 may include a proprietary search engine or proprietary machine classification classifier model that has been previously trained on a proprietary training corpus. The proprietary search engine 112 may be made available by the enterprise 110 to outside users such as the user 102 and/or the query processor 120, for processing their queries without exposing details of the proprietary data, the proprietary search engine or proprietary classifier components, and/or structures to the outside users.

At step 415, a plurality of results are received from the machine search technology. The query may be processed by the enterprise and the results received without ingesting, copying, or storing the data from the enterprise document universe. For example, a plurality of result documents may be received at the query processor 120 from the proprietary search engine 112, after proprietary search engine processes a query that was the submitted from the query processor 120 to the enterprise 110. At the query processor, the document review manager may place the result documents into the result documents repository 202. In some embodiments, the query is submitted from the user (directly or via the network 104) to the enterprise 110 and the result documents are directed to the query processor 120. In various embodiments, the result documents are text, images, graphs, drawings, videos, audio, animation, media, web pages, links to web pages, web objects, or a combination thereof.

At step 420, one or more documents that are selected for user review from the result documents. The result documents may include hundreds, tens of thousands, or even millions of documents, which would be too many for the user to examiner in a reasonable period of time. Often the result documents are ranked by the proprietary search technology. However, as discussed elsewhere herein, the ranking may not be of any benefit to the user, and often is a detriment to the user's personal interests. For example, the ranking may be based on a date associated with the document, a serial number for the document, a size of the document, a number of words, a number of pages, and/or the like. In various embodiments, the one or more documents for user review are selected at random or selected from the top documents of ranked result documents. After step 420, a review of the documents in the result documents buffer 202 may be performed using steps 425-455.

At step 425 the selected document is presented to the user for review. The document review manager 122 may present the selected document to the user 102 via the search interface 124. In some embodiments, the document review manager 122 provides a link to a webpage or link to a web object to the user 102, via the search interface 124. Optionally, document review manager 122 is configured to use the webpage or web object link to obtain a webpage or web object for the user 102, via the search interface 124.

At step 430, the review of the selected document is received from the user. For example, the document review manager 122 may received the reviewed via the search interface 124. The user's review may include an indication that the selected document is either relevant (e.g. 1) or not relevant (e.g. 0).

At step 435, the reviewed document may be added to the set of user trainings. For example, the reviewed document may be added to the training documents buffer 206. The review (e.g. 1 or 0) may be stored with the reviewed document in the training documents buffer 206 as a flag, to indicate that the particular reviewed document is relevant (1) or not relevant (0). In various embodiments, both relevant and non relevant documents are added to the training buffer 206; only relevant documents are added to the training documents buffer 206; or only non-relevant documents are added to the training documents buffer 206.

At step 440, the user model may be retrained on the user training document set. For example, the document review manager 122 may execute the model trainer 208 to retrain the user model 204 on the documents (and associated flags) in the training documents buffer 206. The user model 204 may be retrained each pass through the steps 450-445. In some embodiments, the user model 204 is retrained only after a predetermined number of passes, for example every forth pass. Optionally, the user model 204 is only retrained when the reviewed document is relevant, or in the alternative, only retrained when the reviewed document is non-relevant.

At step 445, a determination made whether or not to end repetition of steps 425-455 and review of the documents in the result documents buffer 202. Steps 425-455 may be repeated a predetermined number of times and then ended. For example, the steps may be repeated 12 times and then branch to step 460 when step 445 is executed.

At step 450, the result documents are classified for selecting a document. For example, the documents in the result document buffer 202 may be classified. The classification may be performed by applying a user model 204 that has been trained on a set of user training documents in the user training documents buffer 206. The user model 204 may be applied to the documents in the result document buffer 202 to select a particular document for review by the user 102. The model 204 may generate a score for each of the documents in the result document buffer 202 and select the document having the highest score. In some embodiments, a plurality of documents are selected. In various embodiments, the selected document(s) include text, images, graphs, drawings, videos, audio, animation, media, web pages, links to web pages, web objects, and/or the like.

At step 455, one or more documents that are selected from the classified result documents. The model 204 may generate a score for each of the documents in the result document buffer 202 and select the document having the highest score. In some embodiments, as the model 204 generates a score for documents in the result document buffer 202, the first one or more documents having a score above a threshold may be selected. The result documents may be ranked for example according to score calculated during classification and one or ore documents may be selected from the top documents of ranked result documents.

The steps may be repeated until a predetermined percent or a predetermined number of the reviewed documents are relevant. For example, the steps may be repeated until 60 percent of the documents are relevant, or until 90 percent of the last ten documents are relevant. In another example, the steps may be repeated until the most recent 6 documents are found to be relevant by the user 102.

In some embodiments, the steps are repeated responsive to a command received from the user. For example, the user 102 may decide at step 445 that enough information has been obtained and elect to stop the reviews. Alternatively, the user may determine from the presented documents that it is appropriate branch to step 460 where a complete classification of the documents in the result documents buffer 202 may be performed and a requested number of relevant documents may be displayed. In some embodiments, the user may input a request at step 445 to provide another document for review (repeat the steps from step 425) until the user is satisfied and then input a request to stop; input a request to present all the relevant documents that have been reviewed; input a request to classify the documents in the result documents buffer 202; input a number of relevant documents for the classifier to find in the result documents buffer 202, and the like.

At step 460, relevant documents may be provided to the user. For example, the document review manager 122 may classify the result documents the trained model 204, and present a predetermined number (e.g., per user requirements) of relevant documents to the user 102. In another example, the document review manager 122 may provide a number of relevant documents that have been reviewed to the user 102. In some embodiments, the user model ranks the classified documents from the result documents 202 and presents a number of top ranked documents to the user 102, e.g. per the user's request. While a number of steps are described in method 400, namely steps 405-460, more or fewer steps may be used to perform the method 400 of FIG. 4.

Figure 5:
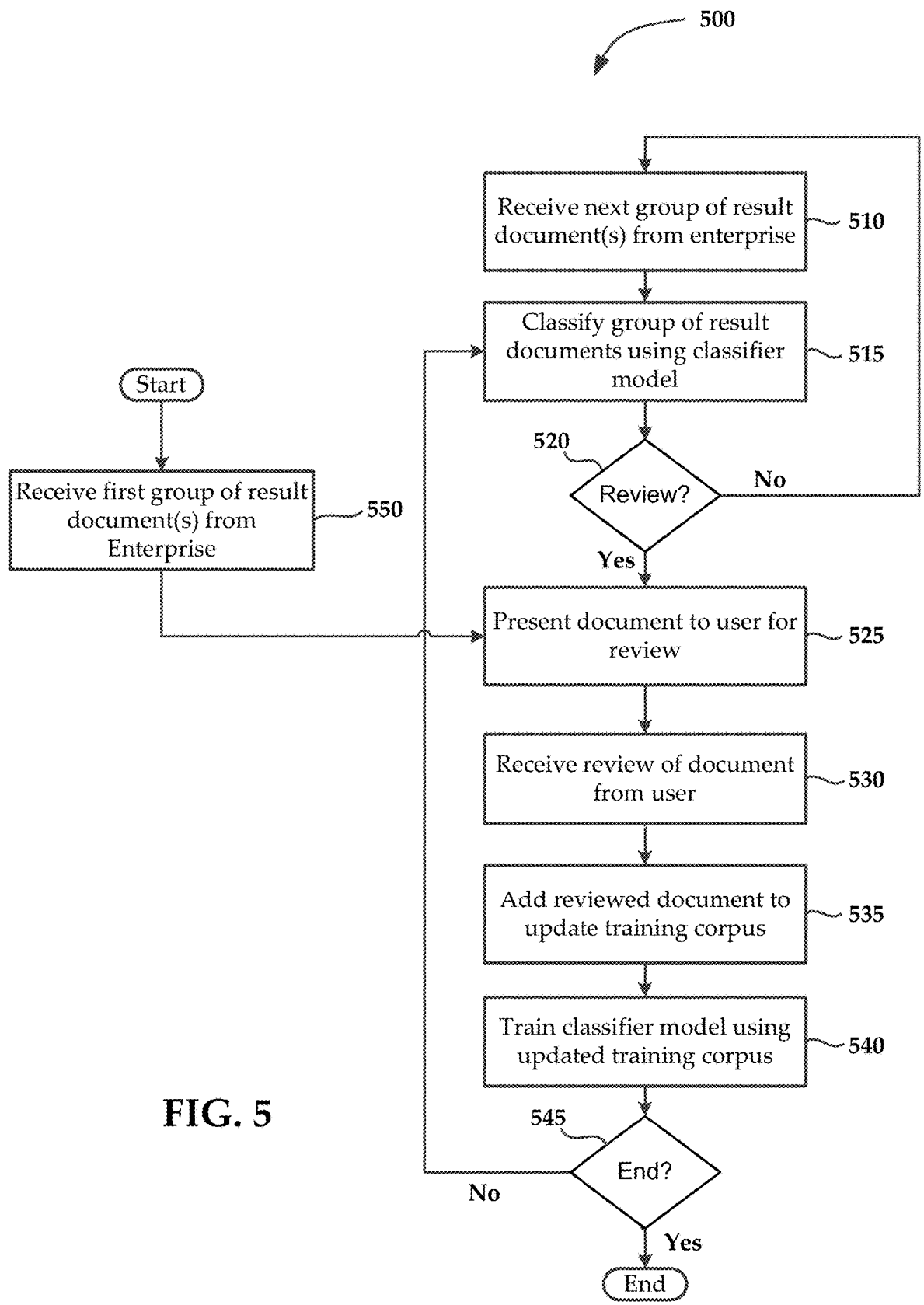
FIG. 5 is a flow diagram of an exemplary method for improving proprietary machine search technology.

FIG. 5 is a flow diagram of an example method 500 for improving search engine technology. At step 510 a group of one or more result documents are received from an enterprise (e.g., the enterprise 110). The enterprise may process the query and search the document universe without ingesting, copying, or storing documents of the enterprise document universe. The result documents may be received without ingesting, copying, or storing documents of the enterprise document universe, other than the result documents.

The result document(s) may be received at a server (e.g., the query processor 120) from a set of enterprise result documents that have been generated in response to a query submitted by a user (e.g., the user 102). For example, the result document(s) may be received at the query processor 120 from the proprietary search engine 112, after proprietary search engine processes a query that was the submitted from the query processor 120 to the enterprise 110.

It is noteworthy that it is not necessary to receive all the enterprise result documents, and the group of one or more result document(s) may be limited to one document at a time or a number of documents at a time, e.g., 50 documents at a time. Thus, the received result document(s) may be received without receiving all of the documents in the set of enterprise result documents. This may serve to reduce storage, time, and/or bandwidth, any of which may be required to transfer a large number of enterprise result documents from the enterprise. The set of enterprise result document may include hundreds, thousands, tens of thousands, or even millions of documents, which may require substantial amounts of time and/or bandwidth to transfer, and a substantial amount of memory to store. This may result in noticeable or unacceptable delays that are experienced by the user.

The documents of the set of enterprise result documents may be ranked by proprietary search technology at the enterprise. In such case, the group of one or more result documents may be received in order of the ranking. However, as discussed elsewhere herein, the ranking may not be of any benefit to the user, and often is detrimental to the user's personal interests. The result document(s) may alternatively be received in a random order from the enterprise.

At the query processor, the document review manager 122 optionally places the group of one or more received document into the result documents repository 202. In some embodiments, the query is submitted from the user (directly or via the network 104) to the enterprise 110, and result document(s) responsive to the query are received from the enterprise 110 at the query processor 120. In various embodiments, the received result document(s) are text, images, graphs, drawings, videos, audio, animation, media, web pages, links to web pages, web objects, or a combination thereof. In some embodiments, the user is internal to the enterprise, and neither the query nor the document universe are made available from the enterprise.

At step 515, the result document(s) are classified using a classifier. The result document(s) may be classified using the user model 204. In some embodiments, a score is calculated by the classifier model for the received result document(s). The score may represent a probability that the result document(s) will be relevant to the user. The result document(s) may be ranked according to the score.

At step 520 a decision is made based on the classification at step 515 whether or not to present the one or more of the classified result document(s) to the user for review by the user. The decision may be based on the calculated score of the best one or more result document(s) of the group. For example, if the score for the best or highest ranked document is greater than a threshold value, then that best document may be presented to the user 102 for review. Otherwise, the best document is not presented to the user 102. The decision may also be based on a comparison of all of the scores to a threshold value.

If the best document in the group of result document(s) does not exceed the threshold value, then rest of the documents remaining in the group of result document(s) also would not exceed the threshold value and the method may return to step 510 to receive a next group of result document. However, in some embodiments, all of the documents are compared. If the decision at step 520 is made to not present any remaining result document(s) to the user, then the method 500 returns to step 510 without a review being performed, and receives a next group of one or more result documents from the enterprise. Also, if no documents remain in the group of result document(s), the method may return to step 510 to receive a next group of result document.

In some instances, none of the documents in the group of result document(s) exceed the threshold or otherwise qualify for presentation to the user for review. Many result documents may be received without being reviewed before one is presented to the user for review. Thus, the classifier may function as a filter to reject result documents or large blocks of result documents that are not likely to be of interest to the user. This may be useful for filtering out advertising and push notifications that are inserted into results of a query for the benefit of the enterprise and detriment and annoyance of the user.

If the decision at step 520 is made to present the result document to the user for review, then the method 500 progresses to step 525.

At step 525, the result document is presented to the user for review. For example, the document review manager 122 presents the result document to the user 102 via the search interface 124. Optionally, the document review manager 122 provides a link to a website, a webpage, or a web object to the user 102, via the search interface 124. The user may then view the website, webpage, or web object and even navigate within the website or to other websites to determine if the link is relevant. In some embodiments, the document review manager 122 tracks the progress of the user 102 through the website or to other websites.

At step 530, a review of the result document is received from the user. For example, the document review manager 122 may received the user's review via the search interface 124. The user's review may include an indication that the result document is either relevant (e.g. 1) or non-relevant (e.g. 0).

At step 535, the reviewed document is added to a training corpus. For example, the reviewed document may be added to the training documents buffer 206 where the training corpus may be stored, which may be a server training corpus. Adding the reviewed document updates the training corpus. The review (e.g. 1 or 0) may be stored with the reviewed document in the training documents buffer 202 as a flag, to indicate that the particular reviewed document is relevant (1) or not relevant (0). In some embodiments, documents that the user considers to be relevant and documents the user considers to be non-relevant are both added to the training buffer 206. Alternatively, only relevant documents are added to the training documents buffer 206, or only non-relevant documents are added to the training documents buffer 206.

At step 540, the user model may be trained or retrained on the updated training document corpus. For example, the document review manager 122 may execute the model trainer 208 to retrain the user model 204 using the documents (and associated flags) in the training documents buffer 206 after it has been updated by the reviewed document added to it.

At step 545, a determination is made whether or not to end the method 500. If the method is not ended, the method 500 returns to step 515 to consider a next document in the group. At step 515, the result document(s) remaining in the group of one or more result documents are classified and ranked again. Then at step 520 a decision is made whether to present one of the remaining result documents to the user for review, and so on.

The method 500 may be repeated a predetermined number of times and then ended. For example, the method 500 may be repeated until 25 documents have been reviewed and then ended. In another example, the method 500 may be repeated until 25 groups of result documents have been received and then ended. The method 500 may be repeated until a predetermined percent or a predetermined number of the reviewed documents are found to be relevant by the user. For example, the method 500 may be repeated until 60 percent of the documents are relevant, or until 90 percent of the last ten documents are relevant. In another example, the method 500 may be repeated until the most recent 6 documents are found to be relevant by the user 102. It is noteworthy that a decision to end the method 500 at step 545 is only reached in FIG. 5 in the branch that includes a document review by the user.

In some embodiments, decision to end the method 500 is responsive to input received from the user. For example, the user 102 may decide at step 545 that enough information has been obtained and elect to end the reviews. Alternatively, the user may determine from the presented documents that it is appropriate to end the method 500 and perform a complete classification of the documents in the result documents buffer 202, from which a requested number of relevant documents may be returned to the user. In some embodiments, the user may repeatedly input a request at step 545 to review another document (repeat the method 500 from step 510) until the user is satisfied. Once the user is satisfied, the user may then input a request to stop; input a request to present all the relevant documents that have been reviewed; input a request to classify the documents in the result documents buffer 202; input a number of relevant documents for the classifier to find in the result documents buffer 202, and/or the like.

Upon ending the method 500 at step 545, the classifier model may be stored for later use on another query. In some embodiments, the documents that were rejected at step 520 may be classified using a current model to determine if any of the early documents that were rejected by an early classifier model should be presented to the user. For example, the documents in the result document buffer 202 may be classified. The classification may be performed by applying a user model 204 that has been trained on the current set of user training documents in the user training documents buffer 206.

After ending the method 500 at step 545, relevant documents may be provided to the user. For example, the document review manager 122 may classify the result documents the trained model 204, and present a predetermined number (e.g., per user requirements) of relevant documents to the user 102. In another example, the document review manager 122 may provide a number of relevant documents that have been reviewed, to the user 102. In some embodiments, the user model 204 ranks the classified documents from the result documents 202 and presents a number of top ranked documents to the user 102, e.g. per the user's request.

At an optional step 550 a first group of one or more result documents is received from the enterprise to initiate the method 500. From step 550, the method 500 may be entered at step 525. The training corpus may be empty, in which case, the first one or more relevant documents received at step 530 are added to the training corpus in the first pass through step 535 to become the first document in the training corpus in step 535, and the classifier model is first trained in the first pass through step 540.

Alternatively, the training corpus may have been populated with training documents from a previous training session, and the model trained using the training corpus. In some embodiments, the model may be trained using terms or documents from the query. The method 500 may begin at step 510. While a number of steps are described in method 500, namely steps 510-550, more or fewer steps may be used to perform the method 500 of FIG. 5.

Figure 6:
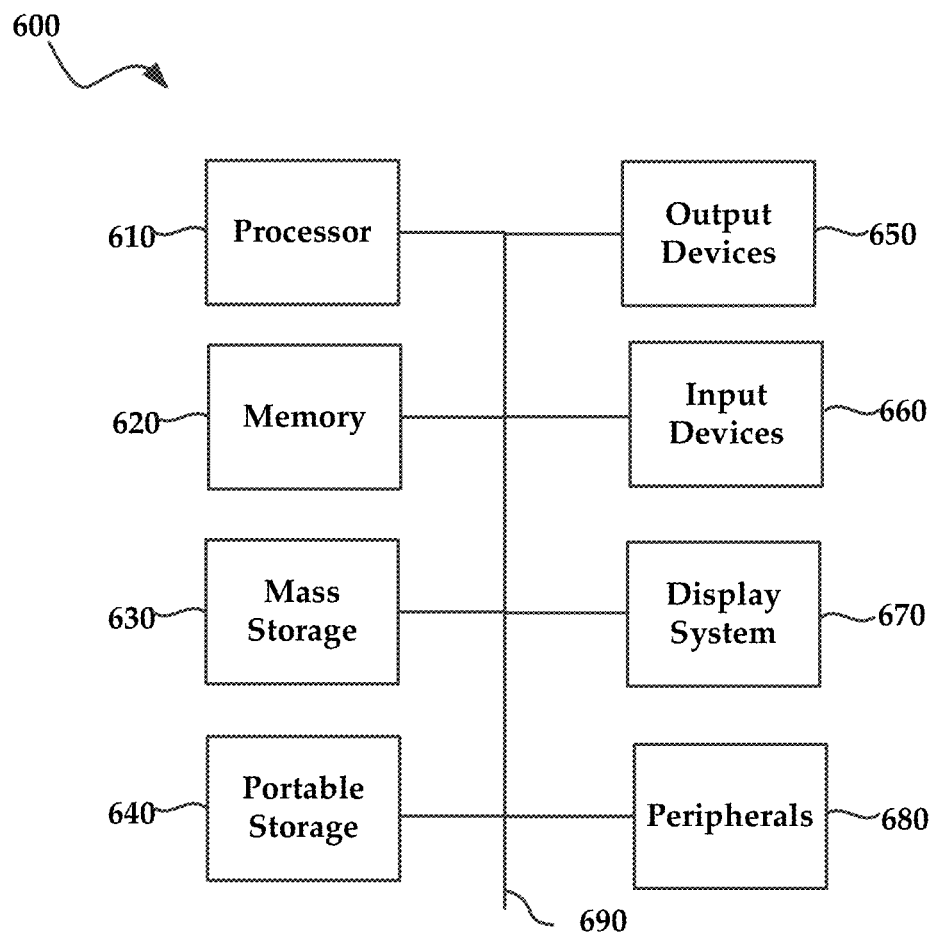
FIG. 6 is a diagrammatic representation of an example machine in the form of a computer system, within which a set of instructions for causing the machine to perform any of one or more of the methodologies discussed herein may be executed.

FIG. 6 is a diagrammatic representation of an example machine in the form of a computer system 600, within which a set of instructions for causing the machine to perform any of one or more of the methodologies discussed herein may be executed. In various example embodiments, the machine operates as a standalone device (e.g. query processor 120, document review manager 122, search interface 124, model trainer 208, and/or controller 210) or may be connected (e.g., networked) to other machines. In a networked deployment, the machine may operate in the capacity of a server (e.g. enterprise 110 or query processor 120) or a client machine, in a server-client network environment (e.g. enterprise 110 or query processor 120), or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated in FIG. 6, the term "machine" shall also be taken to include any collection of machines that individually or jointly execute a set (or multiple sets) of instructions to perform any one or more of the methodologies discussed herein The example computer system 600 includes a processor or multiple processor(s) 602 (e.g., a central processing unit (CPU), a graphics processing unit (GPU), or both), and a main memory 606 and static memory 608, which communicate with each other via a bus 622. The computer system 600 may further include a video display 612 (e.g., a liquid crystal display (LCD)). The computer system 600 may also include an alpha-numeric input device(s) 614 (e.g., a keyboard), a cursor control device (e.g., a mouse, trackball, touchpad, touch screen, etc.), a voice recognition or biometric verification unit (not shown), a drive unit 616 (also referred to as disk drive unit), a signal generation device 620 (e.g., a speaker), and a network interface device 610. The computer system 600 may further include a data encryption module (shown elsewhere herein) to encrypt data.

The disk drive unit 616 includes a computer or machine-readable medium 618 on which is stored one or more sets of instructions and data structures (e.g., instructions 604) embodying or utilizing any one or more of the methodologies or functions described herein. The instructions 604 may also reside, completely or at least partially, within the main memory 606 and/or within the processor(s) 602 during execution thereof by the computer system 600. The main memory 606 and the processor(s) 602 may also constitute machine-readable media.

The instructions 604 may further be transmitted or received over a network (e.g., network 104, see FIG. 1) via the network interface device 610 utilizing any one of a number of well-known transfer protocols (e.g., Hyper Text Transfer Protocol (HTTP)). While the machine-readable medium 618 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and/or the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flow diagram illustrations and/or block diagrams of methods, apparatus (systems) and computer program products according to embodiments of the present technology. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagram and block diagrams in the Figures illustrate the architecture, functionality, and operation of possible implementations of systems, methods and computer program products according to various embodiments of the present technology. In this regard, each block in the flow diagram or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected," "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art with the instant application before them will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for improving results of proprietary machine search technology, the method comprising:
    receiving a query from a user;
    submitting the query to a first machine search technology including a proprietary search engine or proprietary classifier that has been previously trained, and that is made available for processing queries without exposing details, components, and structures of the proprietary classifier;
    receiving a plurality of result documents at a second search technology, the plurality of result documents received from the first machine search technology as a result of a search of a proprietary document universe without ingesting, copying, or storing the searched proprietary document universe at the second search technology, the search performed using the proprietary search engine or proprietary classifier in response to the query; and
    extracting documents that are relevant to the user from the result documents, the
        extraction performed using the second search technology comprising:
            a user model, and
            a set of user training documents for training the user model,
        the extraction comprising:
            a) classifying the result documents, the classification performed by the trained user model of the second search technology;
            b) presenting a document to the user for review, the document selected from the received result documents;
            c) receiving from the user a review of the selected document including an indication that the reviewed document is relevant or not relevant;
            d) adding the reviewed one or more documents to the set of user training documents of the second search technology;
            e) training the user model of the second search technology on the set of user training documents of the second search technology after adding the one or more reviewed documents to the set of training documents; and
            f) repeating from step (a).

2. The method according to claim 1, further comprising determining whether to end extraction of relevant documents before repeating, and upon ending the extraction of relevant documents, providing to the user one or more of the relevant documents extracted from the result documents.

3. The method according to claim 1, further comprising determining whether to end extraction of relevant documents before repeating, the determining whether to end including receiving an indication from the user to select a next document for review by the user from the result documents.

4. The method according to claim 1, wherein each iteration of the extraction is performed in response to a request from the user.

5. The method according to claim 1, further comprising:
    receiving an indication from the user to end the extraction;
    classifying the result documents using the trained user model to generate relevant documents; and
    providing to the user one or more of the relevant documents that are generated from the classification of the result documents.

6. The method according to claim 1, further comprising determining whether to end extraction of relevant documents before repeating, the determination comprising:
    iterating steps (a)-(f) a predetermined number of times,
    then performing a classification of the result documents using the trained user model of the second to generate relevant documents; and
    providing to the user a plurality of the relevant documents generated by the classification.

7. The method according to claim 1, wherein the presented documents from the received result documents at step (b) is selected at random.

8. The method according to claim 1, further comprising:
    ranking the classified documents classified at step (g); and
    selecting the one or more documents in step (h) from the highest ranked documents.

9. The method according to claim 1, wherein the result documents have been ranked by the proprietary search engine and the one or more documents selected from the received result documents in step (a) are selected from the highest ranked documents.

10. The method according to claim 1, further comprising:
    selecting a plurality of documents from the result documents; and
    for each of the plurality of selected documents, performing steps (a)-(f);
    providing to the user one or more of the relevant documents that are generated from the classification of the second plurality of result documents.

11. A non-transitory computer readable storage media having a program embodied thereon, the program being executable by a processor to perform a method for improving results from proprietary search engine technology residing within an enterprise having access to search a document universe by, the method comprising:
receiving at a processor outside the enterprise a set of result documents from the proprietary search engine within the enterprise,
the result document set generated by the proprietary search engine technology within the enterprise in response to a query received at the proprietary search engine technology from the processor,
the result document set received at the processor from the propriety search engine technology without ingesting, copying, or storing the searched document universe at the processor; and
analyzing the received result document set at the processor, the analysis for refining a user model that is personal to the user, the analysis of the result document set comprising:
classifying the result document set using the user model;
presenting a plurality of result documents from the result document set, the presented plurality of result documents selected based on the classification of the result document set;
receiving a review one of the presented documents from the user;
adding the reviewed document to a set of user training documents;
retraining the user model with the set of user training documents; and
repeating the analysis.

12. The method according to claim 11 wherein the presentation of each of the plurality of result decampments includes a link to a web page.

13. The method according to claim 11, further comprising ranking the plurality of result documents using the user model.

14. The method according to claim 11, further comprising initializing the set of user training documents before analyzing at the processor the documents drawn from result document set, the initialization comprising:
selecting one or more initialization documents from the result document set;
receiving a review of the one or more initialization documents from the user; and
adding the reviewed one or more initialization documents to the user training documents.

15. The method according to claim 11, wherein the result documents are received from a plurality of enterprises, each enterprise using a proprietary search engine technology within the, respective, enterprise to generate result documents, the result documents received at the processor without ingesting, copying, or storing the document universe searched by the proprietary search engine technology of the, respective, enterprise.

16. A method for improving machine classification technology, the method comprising:
receiving at a server outside an enterprise a set of result documents from an enterprise in response to a query processed within the enterprise, the result document set extracted from a document universe of the enterprise in response to the query, and
without ingesting, receiving, or storing the document universe of the enterprise at the server outside the enterprise; and
analyzing the result document set received at the server outside the enterprise, the analysis of the result document set comprising:
classifying the result document set using a user classifier model;
ranking classified documents of the result document set, using the user classifier model;
presenting a plurality of the highest ranked result documents to a user;
receiving from the user a review of a result document selected by the user from the result documents presented to the user;
adding the reviewed document to a set of user training documents;
retraining the user classifier model using the set of user training documents, and
repeating the analysis of the result document set.

17. The method according to claim 16, wherein the enterprise generates the result document set using a proprietary enterprise classifier model within the enterprise in response to the query, details of at least one of the enterprise model, training sets, and enterprise model trainers of the enterprise being proprietary to the enterprise and not available outside the enterprise.

18. The method according to claim 16, further comprising:
scoring at the server the result document set using the user classifier model; and
providing a plurality of the scored result documents to the user based on the document scores.

19. A method for improving search engine results of an enterprise, the method comprising:
receiving result documents from a first search technology, the result documents generated using the first search technology to perform a search of a document universe of the enterprise in response to the query; and
selecting a plurality of the result documents for presentation to a user, the selection performed using a second search technology comprising a user model trained using a user training corpus, the selection performed without reference to the first search technology and the document universe of the enterprise, the selection of the documents comprising:
a) presenting a plurality of the classified result documents to the user for review by the user, the presented documents selected from classification of the result documents using the user model trained using the user training corpus;
b) receiving from the user a review of a document selected by the user from the plurality of documents presented to the user;
c) adding the reviewed document to the user training corpus;
d) retraining the user model using the user training corpus; and
e) repeating from step (a).

20. The method according to claim 19, wherein classifying the classification of the result documents using a user classifier further the user model comprises:
calculating a score for each of the classified result documents; and ranking the classified result documents based on the score.

21. The method according to claim 20, wherein presenting a plurality of the classified result documents to the user comprises selecting the plurality of the classified result documents for presentation based on the ranking of the classified result documents.

22. The method according to claim 19, wherein the first search technology is a search engine and the second search technology is a classifier.

23. The method according to claim 19, wherein the selecting a plurality of the result documents using a second search technology is performed outside the enterprise.

* * * * *